United States Patent Office 3,420,508
Patented Jan. 7, 1969

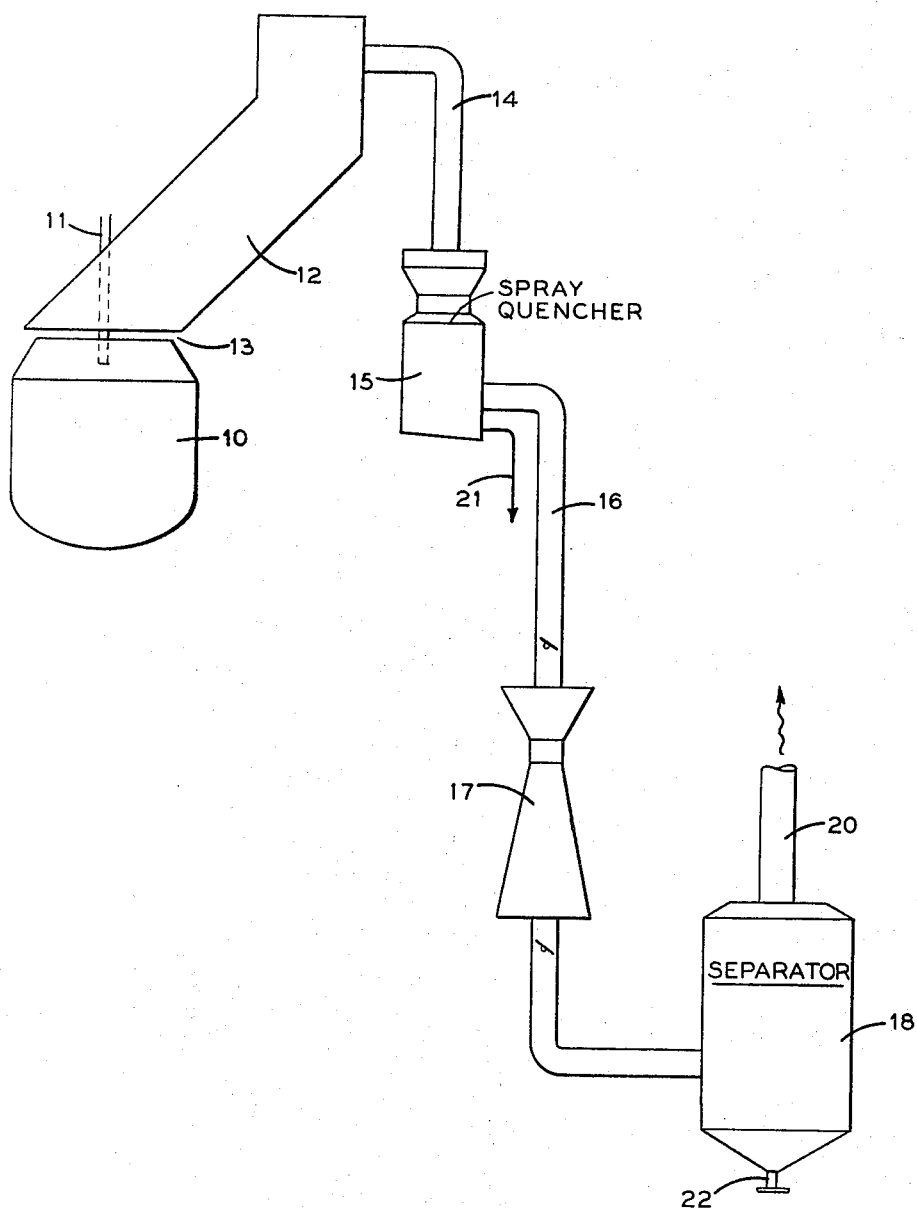

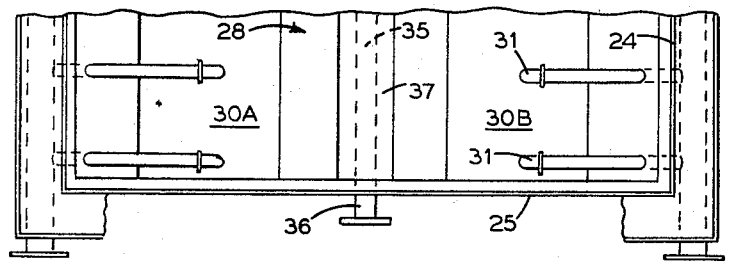
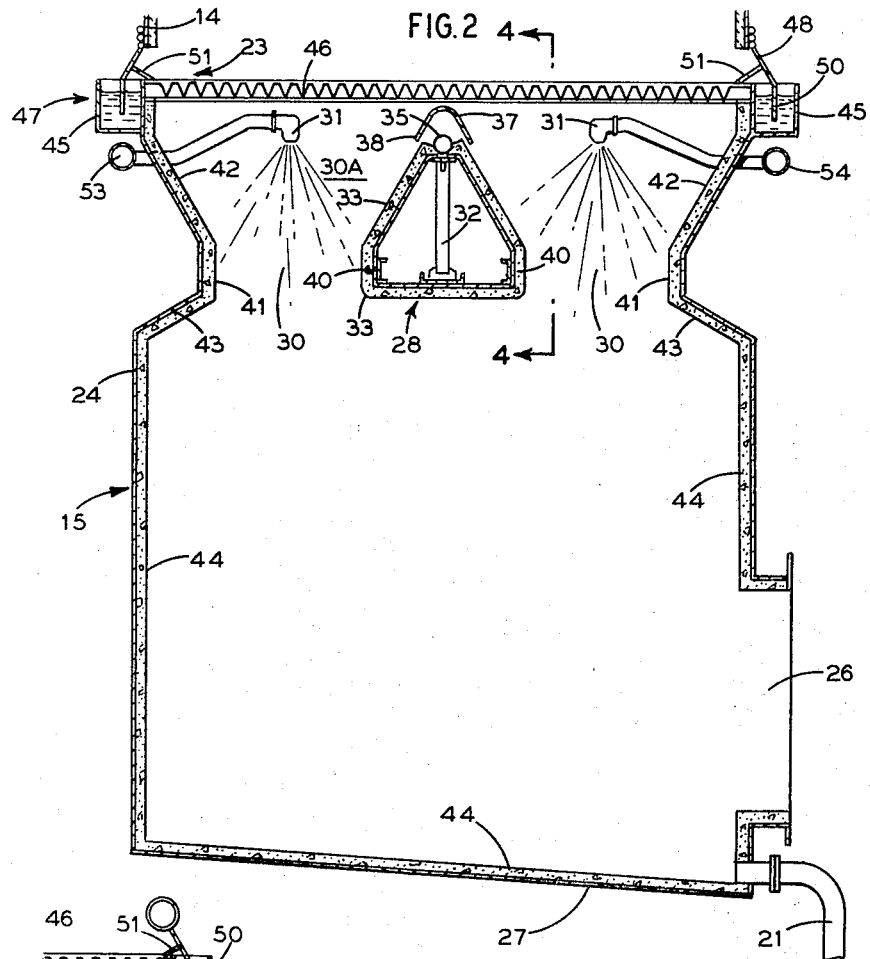
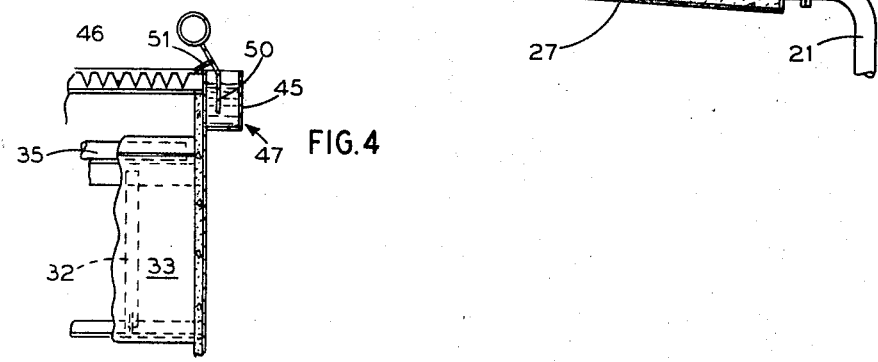

3,420,508
HOT GAS QUENCHER
Thomas B. Hurst, Akron, and Edward P. Darlinger, Barberton, Ohio, assignors to The Babcock & Wilcox Company, New York, N.Y., a corporation of New Jersey
Filed Aug. 15, 1966, Ser. No. 574,275
U.S. Cl. 261—116     7 Claims
Int. Cl. B01d 51/00

ABSTRACT OF THE DISCLOSURE

A hot gas quencher wherein the gases are accelerated in passing between converging walls and contacted by sprays of cooling water during acceleration. The converging walls are washed by films of wash water to remove solids deposited on the walls thereof. Leaving the gas acceleration and spray contact portion of the quencher, the gases are decelerated and turned in its flow direction to encourage the separation of coarse solids from the cooled gases.

---

The present invention relates to a direct contact gas cooling device and more particularly to an improved hot gas quencher particularly adapted to reduce the temperature of the hot gases emitted from a basic oxygen steel furnace preparatory to the removal of entrained solids from the gaseous effluent.

Many industrial processes emit hot gases containing contaminants where subsequent treatment of the gases to remove the contaminants necessitates an intervening stage of gas cooling before the gases can be processed by mechanical cleaning or by chemical absorption. In the basic oxygen furnace the gases are discharged from the furnace at varying rates and at high temperatures during the operating cycle. The majority of installations utilize a controlled infiltration of air to the gases from the furnace to combine with the CO in the gases to form carbon dioxide. Thus the gases leaving the furnace will be in a temperature range of from 3,000 to 3,500° F. The gases contain relatively large quantities of iron oxides which are of economical value and if not recovered form an industrial nuisance when the gases are discharged to the atmosphere. The usual oxygen furnace installation includes a fluid cooled hood which is intended to confine the gases discharged from the furnace and to partially cool such gases. Thereafter the gases are passed through a separate cooling device where the temperature is further reduced preparatory to subsequent wet scrubbing for removal of solids. Alternately other cleaning devices may be used, such as by electrostatic precipitators.

In the present invention a particular form of gas quencher is utilized which is constructed and arranged to effect direct intimate contact between the hot gases and sprays of cooling water. In passing through the quencher the gases are cooled to a temperature of the order of less than 200° F. before being passed to the wet scrubbing device. The quencher is advantageously constructed to effect a preliminary separation of entrained solids from the gases and to remove the collected solids from the quencher.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

FIG. 1 is a line diagram showing the quencher of the present invention incorporated in the gas flow path from a basic oxygen steel furnace to a dust separator;

FIG. 2 is an elevation, in section, of the quencher of the present invention;

FIG. 3 is a partial plan of the quencher shown in FIG. 2; and

FIG. 4 is a section taken along the line 4—4 of FIG. 2.

As shown in FIG. 1 a basic oxygen furnace 10 is positioned in its upright position with the steel therein being treated by a stream of oxygen delivered through a lance 11. During the oxygen refining period a large volume of high temperature gases containing a significant amount of carbon monoxide are discharged from the open upper end of the furnace 10 into a hood 12. In the embodiment shown of the furnace and hood arrangement, air is drawn into the hood through the gap 13 between the lower end of the hood and the upper end of the furnace 10 with air flow regulated for operation of an induced draft fan (not shown). The air entering through the gap 13 combines with the carbon monoxide in the furnace gases to form carbon dioxide, and to increase the temperature of the gases passing through the hood. The gases leaving the hood will ordinarily be in a temperature range of from 3,000 to 3,500° F.

The hood 10 may be constructed as disclosed in U.S. Patent 3,168,073 so as to withstand the service conditions encountered with minimum maintenance and to partially cool the gases. The gas cooling effect is relatively minor and the gas discharging from the hood 10 through the duct 14 will remain at a temperature in excess of approximately 3,000° F. The duct 14 may be constructed with fluid cooled walls or may be formed with a refractory insulated lining to confine the flow of gases which are discharged downwardly into the spray quencher 15. As hereinafter described the spray quencher cools the gases by direct contact with streams of cooling water so that the gases leaving the quencher 15 will be at their saturation temperature, as for example a temperature of the order of 185° F.

The cooled gases thereafter pass through a duct 16 into for example a venturi spray device or scrubber 17 where the gases are contacted by a finely divided liquid spray for dust and liquid agglomeration, and subsequent separation from the gases in a centrifugal separator 18. The gases leave the separator 18 through an outlet duct 20 for ultimate discharge through an induced draft fan (not shown) and thence to the atmosphere.

As hereinafter described some of the solids entrained in the gases are separated in the spray quencher 15 and will be discharged through an outlet pipe 21 from the lower portion of the spray quencher for subsequent treatment and separation of the liquids and solids. Likewise the solids and liquids separated from the gases in the separator 18 are discharged from the lower end thereof through an outlet pipe 22 for subsequent treatment for removal of the solids from the liquid. It will be understood that the devices utilized for separating liquid and solids, to reclaim the iron oxides for subsequent use in the blast furnace are well known. The liquid and solids separating mechanisms may take the form of thickeners, and the like, but since they do not form any part of this invention they are not illustrated. The objective of solids and liquid separating devices is to reclaim the solids and to permit reuse of the liquids in the spray quencher 15 and in the venturi scrubber 17.

In the spray quencher shown in FIG. 2 the gases enter the quencher 15 through an upper inlet 23 which is arranged in receiving relationship with the lower end of the duct 14. As shown in FIGS. 2 and 3 the quencher is constructed with a rectangular, horizontal cross-section although it will be understood the shape of the spray quencher is relatively unimportant in that it can be of cylindrical form, or if desired, can be of square horizontal section.

The spray quencher is formed of generally vertically extending joined side and end walls 24 and 25 respectively and is provided with a gas outlet 26 in one of the side walls 24 so that the gases in flowing downwardly into and through the spray quencher make a 90° turn before discharge. The bottom wall 27 of the quencher forms a floor which is inclined downwardly toward the gas outlet 26 so that solid or liquid materials separated from the gases during the 90° turn of the gas will collect on the floor of the quencher and may be removed through one or more outlet pipes 21 formed in the side wall 24 of the quencher below the gas outlet 26.

As shown, the horizontal rectangular section of the quencher is provided with a divider structure 28 which separates the gas flow path into two parallel flow paths 30A and 30B. As hereinafter described, the gas entering each of the parallel flow paths 30 is contacted by a plurality of water streams emitted from spaced spray nozzles 31 where the horizontal dimension of the parallel gas flow paths and the spacing of the spray nozzles 31 is such as to insure adequate contact between the water sprays and the entering gas streams.

The divider 28 extends from one end wall to the opposite end wall of the vessel forming a pair of parallel passageways of substantially equal cross-sectional flow area. As shown in FIG. 2 the divider 28 is of generally triangular transverse cross-section and is formed of metallic plates secured to a transverse beam 32 extending between the end walls 25. The plates are exteriorly covered by a layer of ceramic material 33 to withstand the erosive effect of the iron oxide containing gases. The upper portion of the divider is provided with a horizontally extending header 35 or manifold which is supplied with cooling water admitted through a flange connection 36 at one end of the header. The upper surface of the header is perforated for discharge of jets of water which are generally directed upwardly and impinge upon an inverted U-shaped hood 37 or spray deflector which overlaps at its lower end 38 the exterior dimension of the upper end of the triangular section divider 28. Water is emitted from the manifold for discharge as a generally uniform film which flows downwardly across the upper surface of the ceramic material 33 to remove any solids which may tend to deposit thereon.

The divider is constructed so that its lower end surface portion 40 is generally vertical, and cooperates with a corresponding surface 41 of the side walls 24 of the quencher to form the pair of restricted throats through which the gases pass.

The side walls of the vessel are provided at their upper portion with downwardly and inwardly inclined surfaces 42 extending between the end walls and which terminate in the vertical surfaces 41 at the general level of the corresponding vertical surface 40 of the divider 28. Thereafter, the side wall plates are bent outwardly and downwardly as at 43 into the plane of the side walls 24. As shown, the interior surfaces of the walls 24 and 25 and floor 27 are provided with a layer of ceramic material 44 similar to that of the divider to withstand the erosive effect of the entrained solids in the gases passing therethrough.

The interior walls of the quencher are provided with an arrangement for the flow of a fluid, such as water, downwardly therealong to wash the surfaces of the vessel and to thereby prevent the accumulation of solids thereon. In the embodiment shown, the water films are supplied from a trough-like member 45 having an open top which encircles the upper end of the walls of the vessel 15. The inner wall of the trough is serrated with the lower edges of the serrations 46 formed at a uniform level throughout the circumferential extent of the vessel. With water supplied to the trough, overflow therefrom is through the lower openings of the serrations 46, so that the water combines in film form to flow along the wall surfaces 42 and 41 of the quencher vessel.

In the embodiment shown the spray quencher 15 is advantageously supported from its lower end on suitable steel work (not shown), while the duct 14 is supported from above by corresponding structural steel members (not shown). With this construction an expansion joint 47 is formed between the duct 14 and the spray quencher 15 so as to provide for expansion and contraction between the fixed support positions of the duct and the spray quencher. The expansion joint is formed by providing a circumferentially extending depending flange 48 which is attached to the lower end of the duct 14 with the lower end 50 of the flange submerged in the liquid maintained in the trough 45. Suitable deflector baffles 51 are formed to extend inwardly of the vessel from the depending flanges 48 so as to divert gas flow toward the inlet of the spray quencher vessel 15. Thus differential expansion between the duct 14 and the spray quencher 15 is compensated by movement of the flange 48 relative to the trough 45.

To attain adequate contact between the incoming hot dust laden gases and the spray water, the spray nozzles 31 are positioned in the entrance to the spray quencher. The spray nozzles are arranged in two parallel rows where each row is position in a vertical plane substantially equi-distant between the opposing surfaces 41 and 40 of the wall restriction and the divider, respectively. The spray nozzles are constructed to project a water spray across the parallel gas flow paths 30A and 30B so that the sprays overlap to compel the gases to be contacted by water spray in flowing into the restricted throat of the vessel. Each of the rows of spray nozzles are supplied with water from exterior headers 53 and 54 mounted on the wall of the quencher vessel.

As an example of the operation of the quencher of the present invention a typical basic oxygen steel furnace might discharge 1,000,000 pounds per hour gas. A typical dust loading in the gas would be of the order of 9,000 pounds of solids per hour. The solids ordinarily are formed predominately of iron oxides. The gases entering the spray quencher will be of a temperature of approximately 3000° F., for example, and approximately 1,500,000 pounds of water per hour are sprayed into the gases in the spray quencher to reduce the temperature of the gases to approximately 185° F. Under such conditions it could be expected that approximately 1,000,000 pounds per hour of water will be withdrawn through the pipe or pipes 21 in the bottom of the spray quencher or overflow and withdrawn through gas outlet 26 while the remaining water, approximately 500,000 pounds per hour would remain with the gases in the form of vapor. The spray quencher will ordinarily reduce the solids content of the gases to approximately 6,000 pounds per hour which will then be largely removed in the venturi scrubber.

While in accordance with the provision of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:
1. Apparatus for cooling hot gases by direct contact with evaporative cooling liquid comprising walls defining a vessel having a gas inlet at one end and a gas outlet in the opposite end portion thereof, means forming a restricted throat in the inlet end portion of said vessel, divider means extended transversely between said walls separating the inlet end portion of said vessel into parallel gas passes of substantially equal cross-sectional flow area, said divider means being of generally triangular transverse section with the base portion located to cooperate with the said throat means, spray nozzle means positioned to pro- ject cooling liquid into the gas entering the throat of said vessel, and means for flowing liquid along the inlet end portion of the wall includes an exterior trough encircling surfaces of said divider means through said gas flow throat to wash the surfaces thereof.

2. Apparatus for cooling hot gases according to claim 1, wherein said spray nozzle means are substantially uniformly spaced in a row in a plane passing midway between the opposing surfaces of each of the gas passageways defined by the divider means and the cooperating wall of the vessel.

3. Apparatus for cooling hot gases according to claim 1, wherein said vessel is upright and the gas flow is downwardly thereto.

4. Apparatus for cooling hot gases according to claim 3, wherein the means for flowing liquid along the inlet end portion of the wall includes an exterior through encircling the upper end of the vessel, means for passing liquid to said trough, and weir means for overflowing liquid from the trough onto the surface of said walls.

5. Apparatus for cooling hot gases according to claim 3, wherein the means for flowing liquid along the surface of said divider means includes a manifold positioned along the upper edge of said divider means, an inverted U-shaped splash shield spaced immediately above said manifold, and means for projecting jets of liquid from said manifold against said splash plate with substantially all the liquid from said splash plate flowing along the exterior surface of said divider means.

6. Apparatus for cooling hot gases according to claim 3, wherein the gas outlet is in the lower portion of a side of said vessel whereby the gases turn through substantially 90° in passing through said vessel.

7. Apparatus for cooling hot gases according to claim 6, wherein the bottom of said vessel is inclined downwardly toward said gas outlet, and means are provided for removing liquid and separated solids therefrom.

References Cited

UNITED STATES PATENTS

| | | |
|---|---|---|
| 885,137 | 4/1908 | Braemer _____ 55—240 |
| 1,272,528 | 7/1918 | Richards. |
| 2,234,735 | 3/1941 | Lambert et al. |
| 2,385,077 | 9/1945 | Harker et al. _____ 55—241 XR |
| 2,656,307 | 10/1953 | Findlay. |
| 3,085,793 | 4/1963 | Pike et al. |
| 3,279,156 | 10/1966 | Wilhelmsson et al. __ 55—241 XR |
| 3,284,435 | 11/1966 | McIlroy et al. ___ 261—116 XR |
| 3,315,443 | 4/1967 | Marino. |
| 3,317,197 | 5/1967 | Lohner et al. |
| 3,347,024 | 10/1967 | Dock et al. |
| 3,367,402 | 2/1968 | Cross et al. _____ 261—116 X |

FOREIGN PATENTS

| | | |
|---|---|---|
| 1,017,715 | 1/1966 | Great Britain. |
| 143,371 | 5/1962 | U.S.S.R. |

HARRY B. THORNTON, *Primary Examiner.*

TIM R. MILES, *Assistant Examiner.*